US009315206B2

(12) United States Patent
Fleming

(10) Patent No.: US 9,315,206 B2
(45) Date of Patent: Apr. 19, 2016

(54) SECURITY ARRANGEMENT IN A MULTI-FUNCTION PASSENGER CARRIER

(71) Applicant: Thule Child Transport Systems Ltd, Calgary (CA)

(72) Inventor: Wesley Fleming, Calgary (CA)

(73) Assignee: Thule Child Transport Systems Ltd., Calgary (CA)

( * ) Notice: Subject to any disclaimer, the term of this patent is extended or adjusted under 35 U.S.C. 154(b) by 2 days.

(21) Appl. No.: 14/428,237

(22) PCT Filed: Oct. 9, 2013

(86) PCT No.: PCT/CA2013/050760
§ 371 (c)(1),
(2) Date: Mar. 13, 2015

(87) PCT Pub. No.: WO2014/059538
PCT Pub. Date: Apr. 24, 2014

(65) Prior Publication Data
US 2015/0232115 A1  Aug. 20, 2015

(30) Foreign Application Priority Data
Oct. 15, 2012 (EP) .................................... 12188528

(51) Int. Cl.
B62B 7/04 (2006.01)
B62B 7/12 (2006.01)
B62K 27/00 (2006.01)
B62B 7/14 (2006.01)
B62B 5/06 (2006.01)
(Continued)

(52) U.S. Cl.
CPC ................. *B62B 7/126* (2013.01); *B62B 5/064* (2013.01); *B62B 5/082* (2013.01); *B62B 7/145* (2013.01); *B62K 27/003* (2013.01); *B62K 27/12* (2013.01)

(58) Field of Classification Search
None
See application file for complete search history.

(56) References Cited

U.S. PATENT DOCUMENTS 3,887,208 A * 6/1975 Vidal ............................ 280/648
4,759,559 A * 7/1988 Moulton ........................ 280/40
5,259,634 A * 11/1993 Berner et al. ................. 280/204
(Continued)

OTHER PUBLICATIONS

International Search Report and Written Opinion of the International Searching Authority for International Appl. No. PCT/CA2013/050760, Canadian Intellectual Property Office, Gatineau, Quebec, mailing date of Jan. 2, 2014, 6 pages.

*Primary Examiner* — Brodie Follman
*Assistant Examiner* — Hilary L Johns
(74) *Attorney, Agent, or Firm* — Sterne, Kessler, Goldstein & Fox P.L.L.C.

(57) ABSTRACT

A multi-function passenger carrier includes a carrier frame and a passenger compartment within the carrier frame, the passenger carrier including first and second means for attaching a first and a second accessory to the carrier frame. The carrier frame includes a security arrangement having a first blocking arrangement for blocking attachment of the first accessory to the carrier frame, a second blocking arrangement for blocking attachment of the second accessory to the carrier frame, first control means for controlling activation and deactivation of the first blocking arrangement, second control means for controlling activation and deactivation of the second blocking arrangement, a connecting member connecting the first control means with the second control means. The first and second control means are arranged to interact through the connecting member to cause the first blocking arrangement to be activated when the second blocking arrangement is inactivated.

17 Claims, 7 Drawing Sheets

(51) Int. Cl.
*B62K 27/12* (2006.01)
*B62B 5/08* (2006.01)

(56) References Cited

U.S. PATENT DOCUMENTS

| | | | | |
|---|---|---|---|---|
| 5,267,744 | A * | 12/1993 | Berry et al. | 280/204 |
| 5,308,096 | A * | 5/1994 | Smith | 280/204 |
| 5,344,171 | A | 9/1994 | Garforth-Bles | |
| 5,421,597 | A * | 6/1995 | Berner | 280/204 |
| 5,431,478 | A * | 7/1995 | Noonan | 297/130 |
| 5,599,033 | A * | 2/1997 | Kolbus et al. | 280/204 |
| 5,641,173 | A * | 6/1997 | Cobb, Jr. | 280/204 |
| 5,695,208 | A * | 12/1997 | Baechler et al. | 280/204 |
| 5,758,889 | A * | 6/1998 | Ledakis | 280/47.38 |
| 5,791,670 | A * | 8/1998 | Hunker | 280/204 |
| 5,941,600 | A * | 8/1999 | Mar et al. | 297/250.1 |
| 5,975,549 | A * | 11/1999 | Ockenden | 280/240 |
| 5,988,670 | A * | 11/1999 | Song et al. | 280/648 |
| 6,056,306 | A * | 5/2000 | Rust et al. | 280/204 |
| 6,155,582 | A * | 12/2000 | Bourbeau | 280/204 |
| 6,260,920 | B1 * | 7/2001 | Tolfsen | 297/256.16 |
| 6,554,307 | B1 * | 4/2003 | Ockenden | 280/204 |
| 6,581,945 | B1 * | 6/2003 | Shapiro | 280/30 |
| 6,623,021 | B1 * | 9/2003 | Nelson | 280/204 |
| 6,976,685 | B1 | 12/2005 | King et al. | |
| 7,011,320 | B1 * | 3/2006 | Gomez | 280/204 |
| 7,017,940 | B2 * | 3/2006 | Hatfull | 280/652 |
| 7,073,859 | B1 * | 7/2006 | Wilson | 297/256.1 |
| D633,825 | S | 3/2011 | Van Leeuwen et al. | |
| 2002/0074764 | A1 * | 6/2002 | Allen et al. | 280/204 |
| 2006/0108766 | A1 * | 5/2006 | Staszak | 280/204 |
| 2008/0067787 | A1 * | 3/2008 | Britton et al. | 280/643 |
| 2008/0143076 | A1 | 6/2008 | Klevana et al. | |
| 2010/0032925 | A1 * | 2/2010 | ehrenreich | 280/204 |
| 2010/0244405 | A1 | 9/2010 | Assaf | |

* cited by examiner

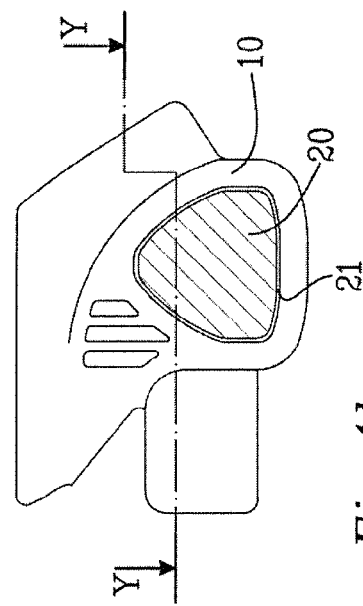
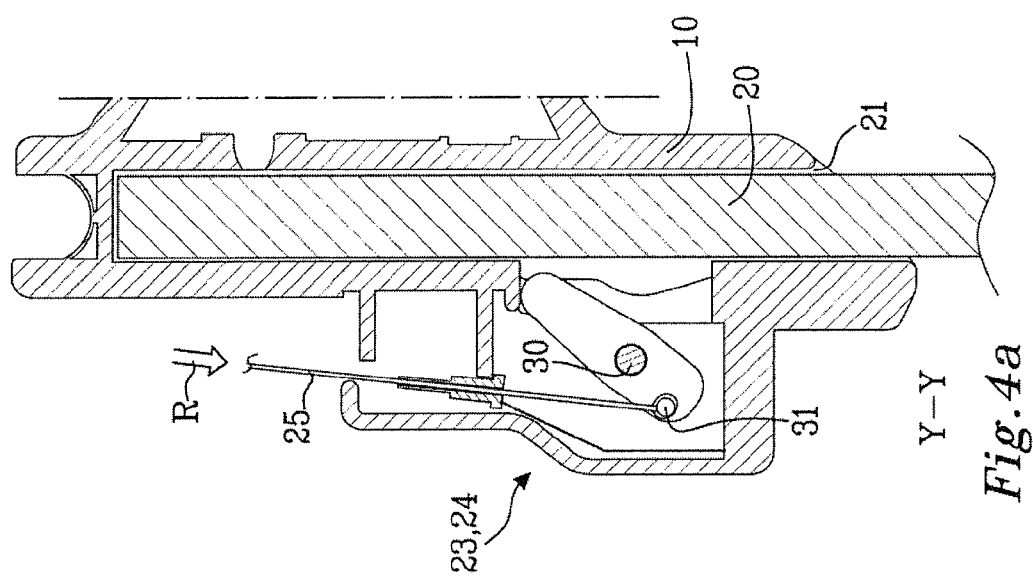

SECURITY ARRANGEMENT IN A MULTI-FUNCTION PASSENGER CARRIER

CROSS-REFERENCE TO RELATED APPLICATION

This application claims the benefit of and priority to European Patent Application No. 12188528.9 filed Oct. 15, 2012 under the title SECURITY ARRANGEMENT IN A MULTI-FUNCTION PASSENGER CARRIER.

The content of the above patent application is hereby expressly incorporated by reference into the detailed description hereof.

FIELD

The invention pertains to a multi-function passenger carrier comprising a carrier frame and a passenger compartment within said carrier frame, said passenger carrier comprising first and second means for attaching a first and a second accessory to said carrier frame.

BACKGROUND

Passenger carriers, in particular child carriers of the stroller type, are commonly made foldable so that they can be easily converted into a compact and space-saving configuration for transport and storage. Multi-function passenger carriers are passenger carriers equipped to be used both as trailers that can be towed by a bicycle or other vehicle or by a skiing person and as manually pushed infant strollers. Combined strollers and bicycle trailers are disclosed in U.S. Pat. No. 5,344,171, U.S. D633,825 S, US 2008/0143076 A1 and US 2010/0244405 A1. When decoupled from a bicycle, the trailer can be converted into a push-type carrier provided with a push-handle to allow the trailer to be pushed by a walking person in a manner corresponding to that of a conventional baby carrier or stroller.

It may be a further desire to adapt the multi-function stroller frame to better suit being pulled after a bicycle or by a skiing person. Moreover, a stroller-type child carrier can be used in different ways also when in a stroller mode. Accordingly, the carrier can be used as a jogging stroller, a walking stroller or by a skiing person pushing the carrier. When using the carrier in a stroller mode, it is commonly desirable to equip the carrier with accessories that are coupled to the carrier frame in a position where the person pushing the carrier can readily reach the accessories. Such accessories include baby seats and other cargo holders which may carry a considerable weight and which when placed in an upper position on the frame may alter the center of gravity of the carrier. The altered center of gravity constitutes a particular problem when the carrier is used as a trailer, as the carrier will then be placed out of control and out of view behind the person pulling the carrier or riding the bicycle to which the carrier is coupled. In such situation a top-heavy carrier may accidentally overturn and the passenger or passengers may be harmed.

It is therefore an object of the present invention to improve the safety of multi-function passenger carriers such as strollers or combined bicycle trailers and strollers.

SUMMARY

In accordance with the invention there is offered a multi-function passenger carrier comprising a carrier frame and a passenger compartment within the carrier frame, the passenger carrier comprising first and second means for attaching a first and a second accessory to the carrier frame. The carrier frame comprises:
- a first blocking arrangement for blocking attachment of the first accessory to the carrier frame,
- a second blocking arrangement for blocking attachment of the second accessory to the carrier frame,
- first control means for controlling activation and deactivation of the first blocking arrangement,
- second control means for controlling activation and deactivation of the second blocking arrangement,
- a connecting member connecting the first control means with the second control means,
- the first and second control means being arranged to interact through the connecting member to cause the first blocking arrangement to be activated when the second blocking arrangement is inactivated.

In accordance with the invention, it is ascertained that the first and second means for attaching an accessory to the carrier frame cannot be used simultaneously. Hence, in an instance where the first means for attaching an accessory is a holder for a drawbar for towing the carrier and the second means for attaching an accessory is a cargo holder, use of the cargo holder will be prohibited when the carrier is coupled to a bicycle by means of the drawbar. Accordingly, the security arrangement of the invention is particularly useful when the passenger carrier is equipped to receive accessories that may be mutually excluding from a safety perspective.

The first means for attaching an accessory to a part of a passenger carrier frame may be a means for attaching an accessory to a lower part of the passenger carrier frame and the second means for attaching an accessory to a passenger carrier frame may be a means for attaching an accessory to an upper part of the passenger carrier frame.

It may be preferred that the first control means and the second control means on the passenger carrier interact in a bi-directional manner resulting in the second blocking arrangement on the passenger carrier frame being caused to be activated when the first blocking arrangement is inactivated. In this manner, activation of the first blocking arrangement leads to inactivation of the second blocking arrangement, and vice versa.

The first means for attaching an accessory to the carrier frame may comprise a holder for a drawbar for pulling the passenger carrier by hand or after a vehicle such as a bicycle.

The passenger carrier of the invention has a front portion and a rear portion in a longitudinal direction of the passenger carrier, an upper portion and a lower portion in a vertical direction of the passenger carrier and two side portions in a transverse direction of the passenger carrier. A holder for a drawbar may be arranged at the front portion of the passenger carrier and preferably at the lower portion of the passenger carrier. The holder may be placed centrally or at a side of the passenger carrier. Two or more holders may be provided in order to allow a user to choose a travel direction of the passenger carrier, to choose a central or lateral attachment point for the drawbar or to accommodate double-shafted drawbars. In a pair of holders, the individual holders may constitute first and second accessories which are provided with blocking arrangements to prevent simultaneous use of the holders, for instance if the holders are arranged at mutually excluding positions on the passenger carrier such as at the front and back part of the carrier.

As is common in the art, a holder for a drawbar may comprise a channel into which an end of the drawbar may be inserted and locked in the inserted position. In a drawbar coupling arrangement with a holder of this type, the first blocking arrangement may comprise a blocking arm which is movable between an active blocking position with a portion of the blocking arm obstructing the channel in the holder and an inactive accessory receiving position wherein the blocking arm is located outside the channel in the holder. In the active blocking position, it is impossible to insert the end of a drawbar into the receiving channel in the holder and the passenger carrier cannot be used in a pulled mode either by manual pulling or by towing behind a vehicle. In the inactive accessory receiving position, the receiving channel is free from obstructions and the drawbar holder can be used for coupling of a drawbar to the passenger carrier.

The second means for attaching an accessory to the carrier frame may comprise a cargo holder. The cargo holder may be a luggage holder, such as a bag holder or a child/baby seat holder. The cargo holder may be directly attached to the carrier frame either permanently or in a way to permit the cargo holder to be removed from the carrier frame. Alternatively, the cargo holder may be indirectly attached to the carrier frame via an accessory coupling arrangement. An example of a suitable accessory coupling arrangement is the accessory cross bar that is disclosed in European patent application No. 12176350.2. When the cargo holder is indirectly attached to the carrier frame by means of an accessory coupling arrangement, the second blocking arrangement may act to block attachment of the cargo holder to the accessory coupling arrangement and/or to block attachment of the accessory, e.g. a baby seat, to the cargo holder.

A cargo holder, such as a baby seat may be arranged at the upper portion of the passenger carrier in order to allow a care-taker pushing the passenger carrier to have easy access to a child placed in the seat. A further advantage by placing a cargo holder at the upper portion of the passenger carrier, is that the carrier assumes a compact and space-saving configuration which makes it particularly suitable for use when walking in a city environment and when using public transportation.

The passenger carrier is preferably provided with a push-handle that is connected to the carrier frame. The push-handle may be placed at the rear portion of the passenger carrier. Common push-handles have a generally horizontally arranged gripping portion which may be straight or curved and which is connected by two generally vertically arranged struts or legs at arranged at the sides of the passenger compartment. Alternatively, the passenger carrier may have one handle on each side of the passenger compartment or a combination of a loop-shaped push-handle and side handles. A further type of push-handle has only a single central strut to which a horizontal gripping bar is attached.

The push-handle may be hingedly connected to the passenger carrier frame so that the angle and height of the gripping part may be adjusted. The push-handle may be arranged to assume at least two different positions in relation to the carrier frame. An adjustable push-handle of this type may be comprised in the second blocking arrangement and may be used in preventing direct or indirect attachment of a second accessory to the carrier frame such as to the upper part of the carrier frame.

Accordingly, the push-handle may be arranged to be tilted into a position where it blocks or shields an accessory attachment site. For instance, the push-handle may be arranged to block attachment of the second accessory when the push-handle is in a forwardly tilted position on the carrier frame.

The blocking arrangements may comprise locking means for locking the arrangements in a blocking position or configuration. The provision of locking means may be desired in order to prevent a user from over-riding the blocking function and return a blocking element such as a push-handle to a position where a second accessory can be mounted on the carrier frame simultaneously with a first accessory. The locking arrangement is preferably connected to the first and second control means acting on the first and second blocking arrangements and is arranged to come into action when the first blocking arrangement is inactive and the second blocking arrangement is active.

In case of the blocking arrangement comprising a push-handle, locking means may be provided for locking the push-handle in the blocking position, such as a forwardly tilted blocking position.

The locking means is preferably triggered by activation of the corresponding blocking arrangement. The locking means may be any type of locking mechanism as known in the art, such as snap-locks, locking pins etc. When a push-handle is used in a blocking arrangement, the locking means may be a spring-loaded locking pin that co-operates with a corresponding receiving member which may be a hole or cut-out in a hinge between the carrier frame and the push-handle. Tilting of the push-handle into the blocking position will then cause the locking pin to engage with the receiving member in the hinge and lock the push-handle in the blocking position.

The connecting member connecting the first and second control means may be any type of connecting member allowing the first and second control means to be interconnected such that activation of one of the blocking arrangements causes the other blocking arrangement to be inactivated. Suitable connecting members comprise mechanical connectors such as levers, rods, wires, ropes and bands as well as electric connectors such as cables. A flexible elongated mechanical connecting element such as a wire, a rope or a band may be particularly preferred in a safety arrangement according to the invention.

A flexible elongated connecting element may be threaded onto the carrier frame and may interact with parts of the carrier frame and with accessory attachment members on the carrier frame to selectively block one attachment site in a pair of attachment sites. The connecting element may be arranged to act on hinged and/or spring-loaded portions of the carrier frame when being pulled or tightened and may be arranged to assume a tightened position resulting in a first configuration of the carrier frame and/or one or more accessory attachment member and a relaxed position resulting in a distinctly different configuration of the carrier frame and/or one or more accessory attachment members.

Furthermore, the carrier frame may comprise at least one hollow frame element and the flexible elongated element may be arranged within the at least one hollow frame element in the carrier frame.

DEFINITIONS

The term "multi-function passenger carrier" refers to a vehicle that can be used either as a trailer that is pulled or towed behind a vehicle such as a bicycle or manually pulled by a skiing or walking person, or as a push-carrier or stroller used by a person walking, running, jogging or skiing.

By a horizontal direction as used herein is implied a direction in a horizontal plane of a passenger carrier when in an in-use-position, i.e. while being pulled after a bicycle or being pushed by a person.

By a vertical direction as used herein is implied a direction in a vertical plane through a passenger carrier when in an in-use position, i.e. while being pulled after a bicycle or being pushed by a person.

By a front part of a passenger carrier or a carrier frame as used herein is implied a part that is intended to be facing forward in the travelling direction, either towards a bicycle if the passenger carrier is coupled to a bicycle, or to be facing away from a pusher of the passenger carrier when it is used as a push carrier.

A back or rear part of a passenger carrier is a part opposite to the front part and is intended to be facing away from a bicycle or towards a person pushing the carrier depending on how the passenger carrier is being used.

An upper part of a passenger carrier or carrier frame is a part facing upward, away from the ground when the passenger carrier is in an in-use position.

A lower part of a passenger carrier or carrier frame is a part facing downward towards the ground when the passenger carrier is in an in-use position.

A travelling direction of a passenger carrier is a direction in which the passenger carrier is designed to be moved. The travelling direction corresponds to a longitudinal direction of the passenger carrier, and is perpendicular to the transverse direction and the height direction of the passenger carrier.

Positional terms such as "upper", "lower", "underside", etc. when used herein to describe the location of an element should be understood as referring to a passenger carrier when in a position for use as a trailer or a push-carrier. Positional terms are used in a corresponding way to describe the relative positioning of elements in a passenger carrier in an in-use position.

A carrier frame, as used herein is a structure comprising frame elements defining the general shape of the passenger carrier. The carrier frame includes the push-handle but not any wheels, passenger seats, covering, etc. or any removable equipment or accessories. The frame body is the part of the carrier frame surrounding the passenger space. The frame body does not include the push-handle.

The term "blocking arrangement" should be understood in a broad sense as an arrangement that constitutes a hinder against proper mounting of an accessory to the carrier frame. A blocking arrangement may include a part or parts that physically block or shield a mounting site to render it inaccessible for mounting of an accessory or may function by physically altering the configuration of a mounting site rendering it unsuitable for mounting of an accessory.

BRIEF DESCRIPTION OF THE DRAWINGS

The invention will be described in greater detail with reference to the appended drawings in which:

FIG. 3b shows a front view of the drawbar holder in FIG. 3a;

FIG. 4a shows a horizontal section through a drawbar holder constituting a first means for attaching an accessory and in the mode of operation shown in FIG. 2;

FIG. 4b shows a front view of the drawbar holder in FIG. 4a;

DETAILED DESCRIPTION

Figure 1:
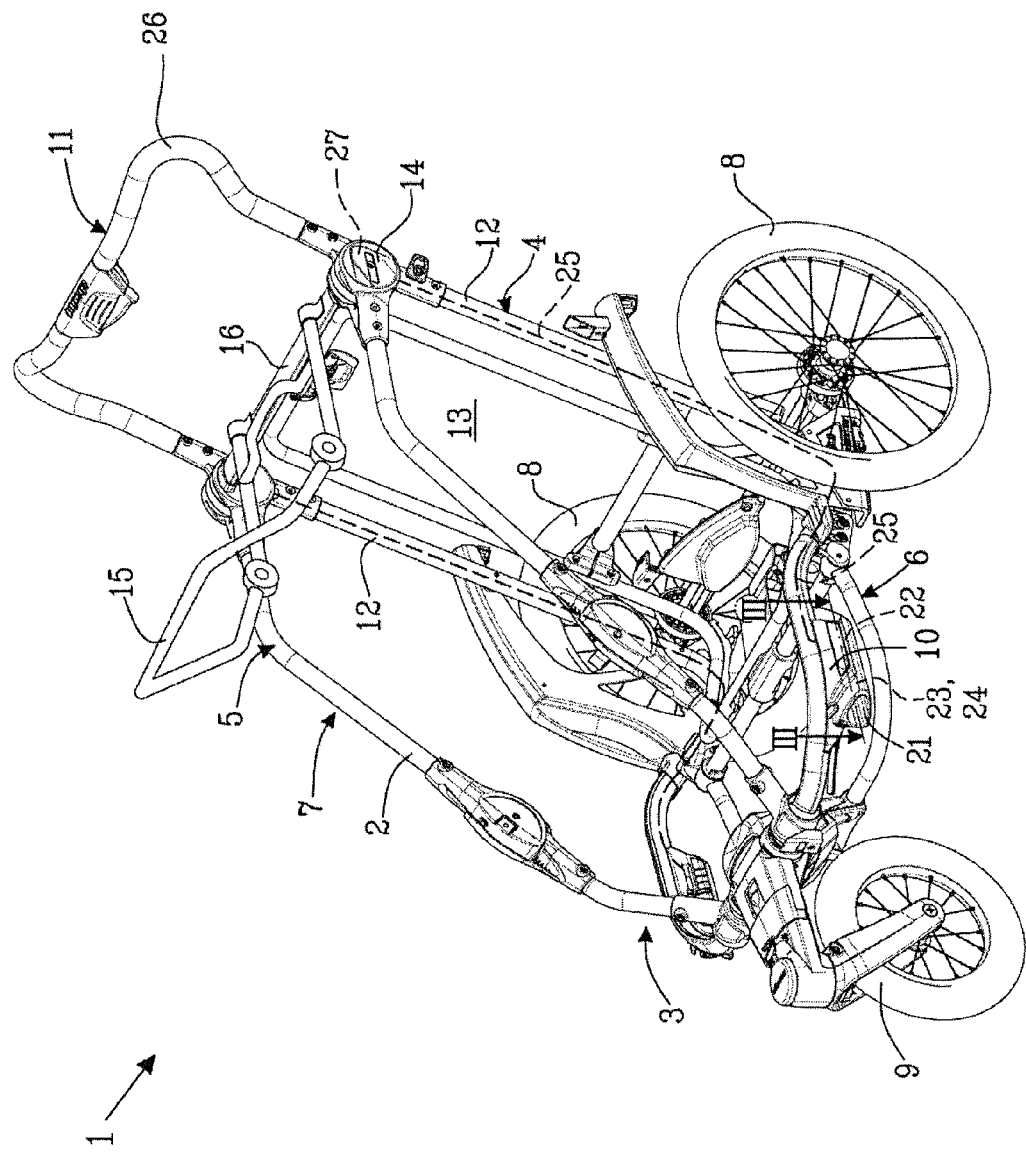
FIG. 1 shows a perspective view of a passenger carrier without any covering and in a first mode of operation.
Figure 2:
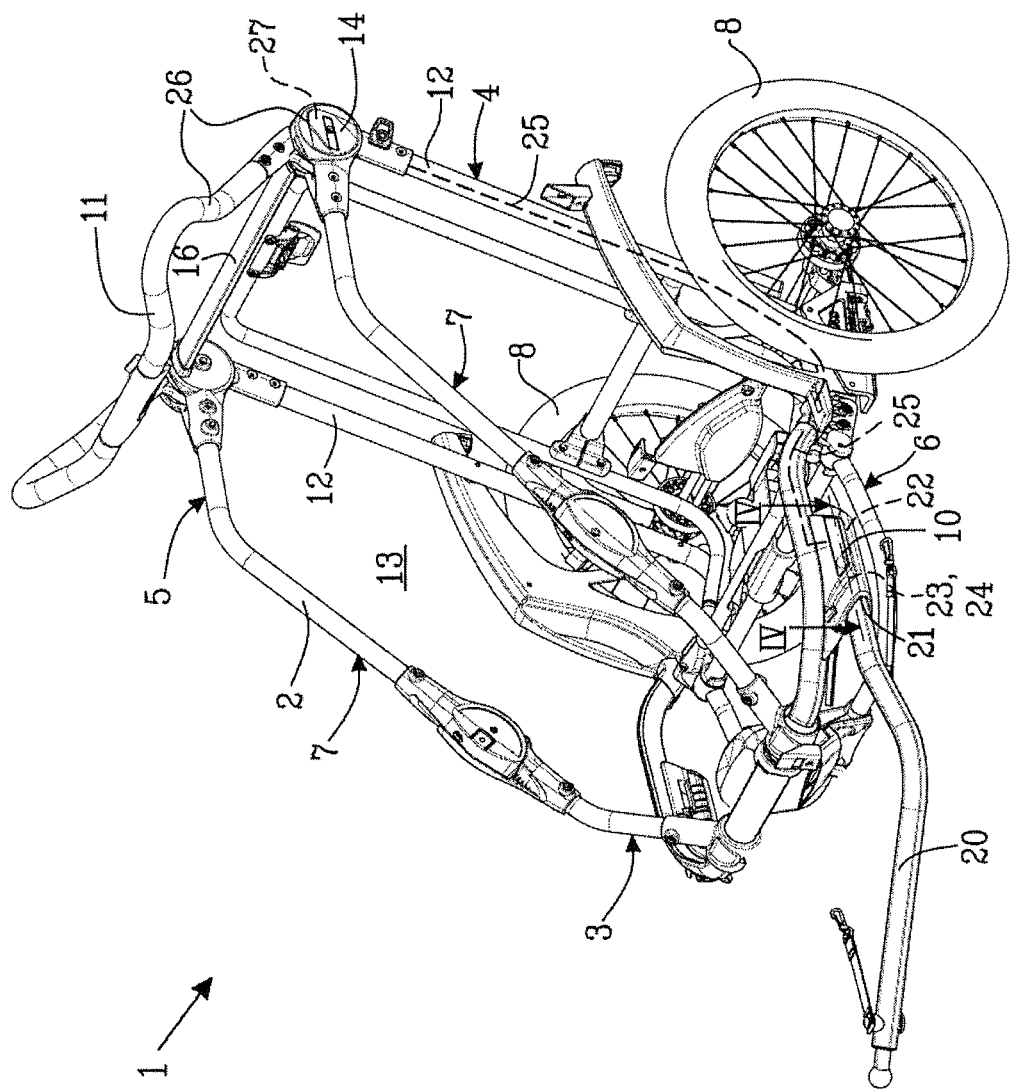
FIG. 2 shows the passenger carrier in FIG. 1 in a second mode of operation.

The passenger carrier 1 in FIG. 1 is shown without any covering, revealing the structure of the passenger carrier frame 2. The passenger carrier 1 has a front part 3, a rear part 4, an upper part 5, a lower part 6 and two sides 7 as seen in FIGS. 1 and 2. The passenger carrier 1 is a multi-function passenger carrier that can be used in a trailer mode, e.g. coupled to the rear end of a bicycle and in a stroller mode allowing the carrier to be pushed by a walking or running person. The passenger carrier 1 in FIG. 1 is shown in the stroller mode, i.e. without any connection to a bicycle. Apart from the passenger carrier frame 2 and the covering that is absent in FIG. 1, the passenger carrier 1 comprises two rear wheels 8 mounted on a horizontal rear axis and a front wheel 9 pivotably mounted on the front portion 3 of the passenger carrier 1. When the passenger carrier 1 is in the trailer mode, it can be coupled to the rear end of a bicycle by means of a drawbar holder 10 arranged at the front portion 3 of the passenger carrier 1. The drawbar holder 10 is shown to be positioned low on a side of the front portion 3 of the carrier frame 2. As disclosed herein, a drawbar holder may also be placed on the opposite side of the carrier frame 2 or at any other suitable location on the carrier frame 2.

The passenger carrier 1 shown in FIGS. 1 and 2 can be folded into a compact transport and storage configuration by folding the passenger carrier frame 2 at lockable pivot joints. Foldability is generally a desired feature of a passenger carrier but is not an essential feature of the passenger carrier 1 according to the invention and will not be further described herein.

The passenger carrier frame 2 further comprises a central push-handle 11 at the rear portion 4 of the passenger carrier frame 2. The push-handle 11 has a generally horizontally arranged gripping portion and forms an arch-like connection between two generally vertically arranged hollow side struts 12 extending from the upper portion 5 of the passenger carrier 1 to the lower portion 6 of the passenger carrier 1 at each side of a passenger carrier compartment 13 located inside the passenger carrier frame 2. The push-handle 11 is connected to the remaining carrier frame 2 by hinges 14 allowing the angle and height of the push-handle 11 to be adjusted. The push-handle 11 is arranged to assume at least two different positions in relation to the carrier frame 2 corresponding to the stroller mode and the trailer mode of the passenger carrier 1.

The specific shape and construction of the push-handle that is shown in FIGS. 1 and 2 should not be considered to be limiting to the invention, as many other shapes may be envisaged by a person skilled in the art such as a pair of non-connected handles or a handle arranged on a single central supporting rod. Furthermore, it is to be understood that the shape and construction of the carrier frame 2 may be different from that shown in FIG. 1. For instance, the shape of the passenger compartment may be different; the passenger carrier may have two front wheels, etc.

The passenger carrier 1 in FIG. 1 is shown in a stroller mode and is suitable for being pushed by a person moving behind or at a side of the passenger carrier 1 and gripping the push-handle 11. The passenger carrier 1 in FIG. 1 is equipped with a cargo holder 15 which is adapted to receive and hold a baby seat in a position corresponding to that shown in FIG. 5. As disclosed herein, the passenger carrier of the invention may be provided with any type of cargo holder such as bags, baskets, cargo plates, trays, etc. and should not be considered limited to the baby seat holder shown in the figures.

As disclosed herein, the cargo holder may be directly attached to the carrier frame either permanently or in a way to permit the cargo holder to be removed from the carrier frame. In the passenger carrier 1 in FIG. 1, the cargo holder is shown to be indirectly attached to the carrier frame 2 via an accessory coupling arrangement in the form of an accessory cross bar 16 of the type disclosed in European patent application No. 12176350.2.

In FIG. 2, the passenger carrier 1 is shown in a trailer mode allowing it to be pulled or towed by means of a first accessory 20 constituted by a towbar that is attached to the drawbar holder 10 by being inserted through an opening 21 in the front end of the drawbar holder 10 into a receiving channel 22 inside the drawbar holder. In the trailer mode, the front wheel 9 has been removed from the carrier frame 2. Alternative ways of adapting the carrier to better suit being pulled as a trailer include folding away one or more front wheels on the underside of the carrier. The manner of neutralizing the front wheel or front wheels which is chosen is not critical to the invention.

The passenger carrier 1 in FIG. 2 is further shown with the cargo holder 15 removed from the accessory cross bar 16 and with the push-handle 11 tilted in a forward position in over the upper portion 5 of the passenger carrier 1.

The drawbar holder 10 comprises an internal first blocking arrangement 23 and a first control means 24 for controlling activation and deactivation of the first blocking arrangement 23. A connecting member 25 in the form of a connecting wire extends from the first control means 24 inside tubular hollow frame elements making up the carrier frame 2 such as inside the hollow side strut 12 extending from the rear wheel axis to the interior of the push-handle hinge 14. A second blocking arrangement 26 and a second control means 27 for controlling activation and deactivation of the second blocking arrangement 26 are arranged at the upper portion 5 of the passenger carrier 1. The second blocking arrangement 26 includes the push-handle 11 and the push-handle hinge 14. The second control means 27 is constituted by a mechanism inside the push-handle hinge 14 as will be described in the following in relation to FIG. 5.

When positioned as shown in FIG. 2, the push-handle 11 is tilted into a position where it physically blocks access to the accessory cross bar 16, disabling attachment of a cargo holder 15 to the accessory cross bar 16 and indirectly disabling attachment of a baby seat, a bag or similar to the cargo holder 15.

The function of the blocking arrangements 23, 26 and the control mechanisms 24, 27 will now be more closely described with reference to FIGS. 3a, 3b, 4a, 4b and FIG. 5.

Figure 3B:
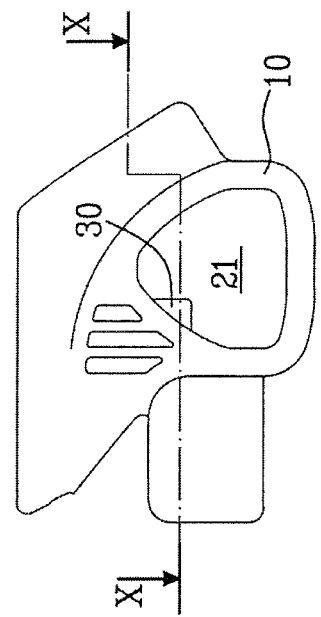
Figure 3A:
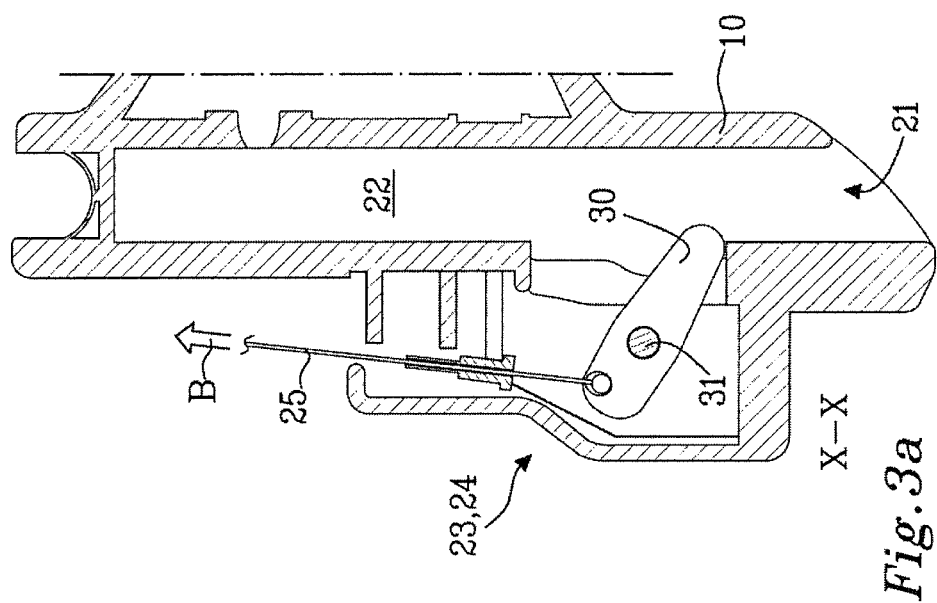
FIG. 3a shows a horizontal section through a drawbar holder constituting a first means for attaching an accessory and in the mode of operation shown in FIG. 1.

With reference to FIGS. 3a and 4a, these figures show the interior of the drawbar holder 10 as seen from above. The first blocking arrangement 23 which is arranged inside the housing of the drawbar holder 10 comprises a movable blocking arm 30. The blocking arm 30 is movable between the active blocking position shown in FIGS. 3a and 3b with a portion of the blocking arm obstructing the drawbar receiving channel 22 in the holder 10 by protruding into the channel 22, and an inactive accessory receiving position wherein the blocking arm 30 is withdrawn from the channel 22 in the holder 10, allowing a drawbar 20 to be inserted into the channel 22.

The blocking arm 30 is attached to a first end 25' of the connecting member 25 and is arranged to flip around a pivot axis 31 between the blocking position shown in FIGS. 3a and 3b and the accessory receiving position shown in FIGS. 4a and 4b in response to tensioning and relaxation of the connecting member 25. Accordingly, when the connecting member 25 is tensioned by being pulled in the blocking direction B, the tip of the blocking arm 30 will move into the drawbar receiving channel 22 and when the connecting member 25 is moved in the receiving direction R, the blocking arm 30 will move out of the drawbar receiving channel 22. In the blocking position, the connecting end of the drawbar 20 can be inserted into the drawbar receiving channel 22 through the opening 21 in the drawbar holder 10 as is shown in FIGS. 4a and 4b.

Figure 5:
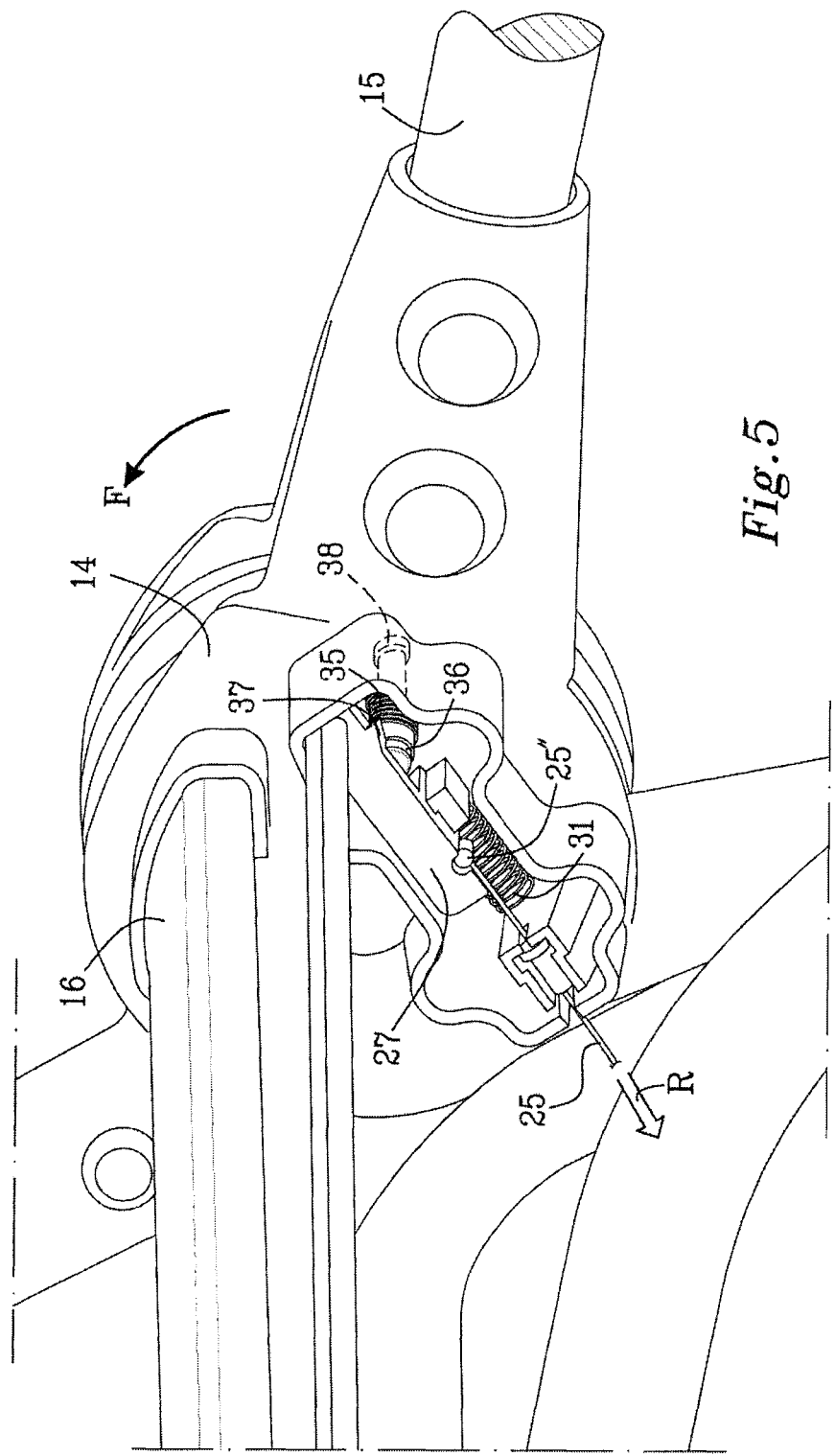
FIG. 5 shows a cross-section through a push-handle hinge mechanism in the passenger carrier in FIGS. 1 and 2.

The second blocking arrangement 26 is controlled by the second control means 27 which is placed in the push-handle hinge 14 at a second end 25" of the connecting member 25 as shown in FIG. 5. The second control means 27 includes a compressible spring 31 and a spring actuating member 32, which will cause the spring 31 to be compressed as the push-handle 11 is moved in a forward direction F and the connecting member 25 moves in a direction R which is the release direction R for the first control means 24 in the drawbar holder 10. This means that simultaneously with moving the push-handle 11 into the forward-tilted blocking position disabling mounting of a cargo holder 15, as best shown in FIG. 2, the connecting member 25 will move the blocking arm 30 in the drawbar holder 10 into the drawbar receiving position, enabling attachment of a drawbar 20 in the drawbar holder 10. In the position shown in FIG. 5, a cargo holder 15 can be mounted on the accessory cross bar 16 while attachment of a drawbar in the drawbar holder is prohibited.

The mechanism in the push-handle hinge 14 further includes a locking mechanism 35.

The locking mechanism 35 in the push-handle hinge 14 is triggered by activation of the second blocking arrangement 26. The locking means consists of a spring-loaded locking pin 36 which is actuated by a wedge-shaped member 37 and which co-operates with a corresponding receiving member 37 which is indicated as a hole inside the hinge mechanism. Tilting of the push-handle 11 into the blocking position causes the wedge-shaped member 37 to press the locking pin 36 into engagement with the receiving member 37 in the hinge 14 and lock the push-handle 11 in the blocking position. The locking mechanism 35 ascertains that there is no risk of inadvertently or intentionally over-riding the blocking of the accessory cross bar 16 while the drawbar holder is being used and constitutes an additional safety arrangement for preventing simultaneous use of two incompatible accessories. An additional safety arrangement in the form of a locking means is an optional feature of the invention.

The blocking mechanisms for the drawbar holder 10 and the cargo holder 15 may be considered to be reciprocating mechanisms implying that when one blocking mechanism is activated, the other blocking mechanism is deactivated, as described herein.

Figure 6:
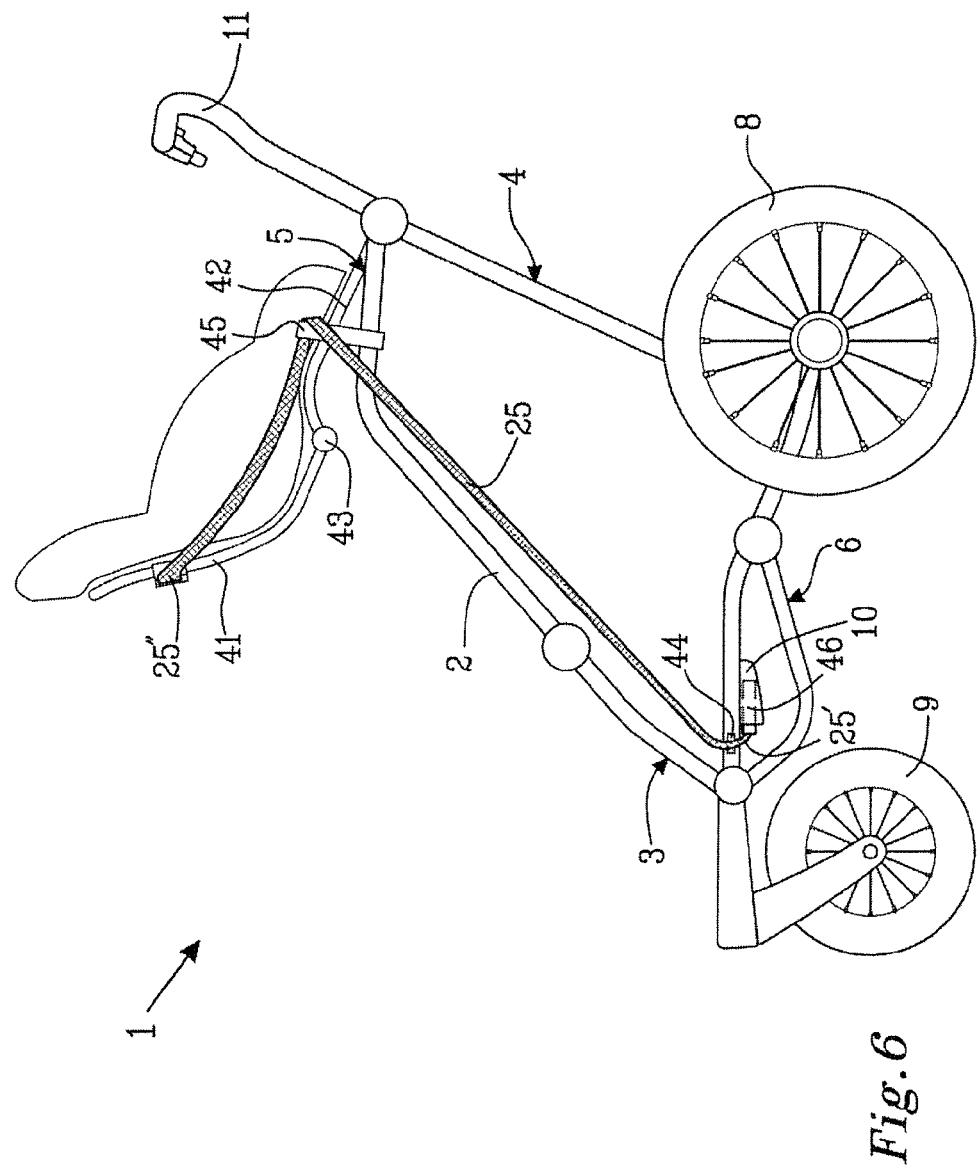
FIG. 6 shows a perspective view of a passenger carrier in a first mode of operation.
Figure 7:
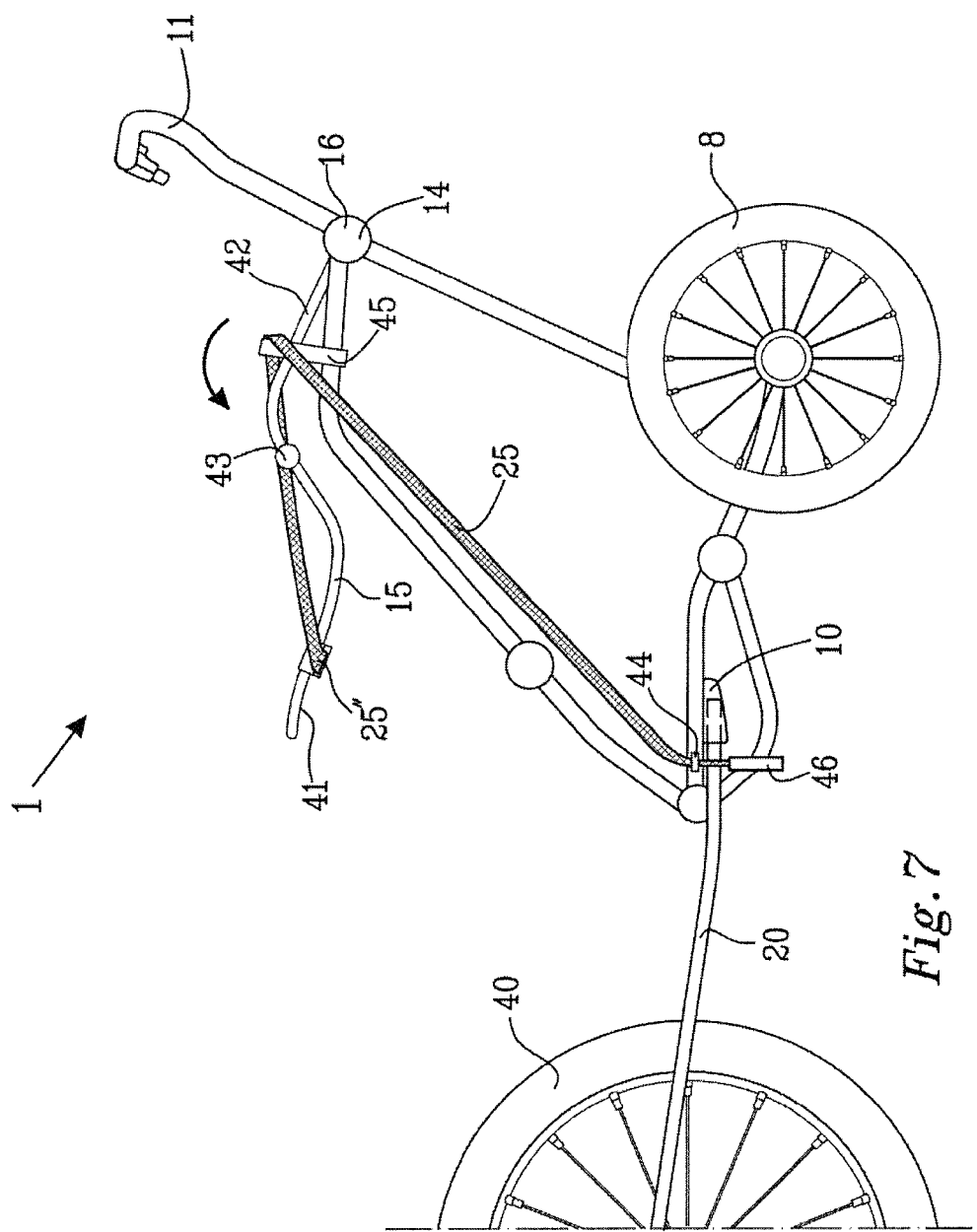
FIG. 7 shows the passenger carrier in FIG. 5 in a second mode of operation.

FIGS. 6 and 7 show a second embodiment of a multi-function passenger carrier 1 according to the invention. The passenger carrier 1 is shown from the side without any covering, and with the passenger carrier frame 2 and other components such as the wheels 8, 9 and the push-handle 11 schematically illustrated. The passenger carrier 1 has a front part 3, a rear part 4, an upper part 5, a lower part 6 and two sides 7 as seen in FIGS. 1 and 2. The passenger carrier 1 is shown in the stroller mode in FIG. 6 and in the trailer mode in FIG. 7. The passenger carrier 1 comprises two rear wheels 8 mounted on a horizontal rear axis and a front wheel 9 pivotably mounted on the front portion 3 of the passenger carrier 1. In the trailer mode shown in FIG. 7, the passenger carrier 1 can be coupled to the rear end of a bicycle 40 by attaching a drawbar 20 in a drawbar holder 10 arranged at the front end 3 of the passenger carrier 1. As in the FIG. 1 embodiment, the drawbar holder 10 is shown to be positioned on a lower portion of a side of the front portion 3 of the carrier frame 2 although other locations are conceivable within the scope of the invention. The drawbar holder 10 is similar to the drawbar holder 10 in FIG. 1 in that it has an inner drawbar receiving channel 22 and a forward opening 21 through which a drawbar 20 can be inserted into the drawbar receiving channel 22.

The passenger carrier in FIGS. 6 and 7 further comprises a cargo holder 15 in the form of a baby seat holder. The cargo holder 15 may be directly attached to the carrier frame 2 or may be indirectly attached by means of an adapter such as the accessory cross bar 16 shown in FIG. 1. The cargo holder 15 comprises an upper part 41 and a lower part 42 which are connected by hinge means 43. A guiding loop 44 is arranged on the carrier frame 2 in front of the opening in the drawbar holder 10. A connecting member 25 in the form of a band is arranged with a first end 25' inserted through the guiding loop 44 and with a second end 25" attached to the upper part 41 of the cargo holder 15. The connecting member 25 is threaded through suitably placed guiding elements 45 on the outside of the carrier frame 2 from a first, remote side of the upper part 41 of the cargo holder 15, horizontally across the upper part 41 of the cargo holder 15 to a proximal side of the cargo holder 15 and down to the guiding loop 44 where the connecting member 25 terminates in a blocking rod 46. The terms "remote" and "proximal" refers to the location of the sides as perceived by a viewer of FIGS. 6 and 7.

Although the connecting member 25 is clearly visible in FIGS. 6 and 7, it is to be understood that it may be arranged in a less conspicuous manner when the passenger carrier is provided with a covering. Accordingly, the connecting member 25 may extend partially on the inside of the covering and/or in one or more channels arranged in the covering.

In accordance with the invention, the drawbar holder 10 constitutes a first means for attaching an accessory to a lower part of a passenger carrier frame 2 and the cargo holder 15 constitutes a first means for attaching an accessory to an upper part of a passenger carrier frame 2.

The blocking rod 46 is shaped and sized to fit inside the drawbar receiving channel 22 in the drawbar holder 10 and is used to block insertion of a drawbar 20 into the drawbar receiving channel 22.

In terms of the invention, the first blocking arrangement is provided by the blocking rod 46 which is controlled by the first end 25' of the connecting member 25 and the second blocking arrangement is provided by the hinge means 43 between the parts of the cargo holder 15 which is controlled by the connecting member 25.

The security arrangement constituted by the first and second blocking arrangements in FIGS. 6 and 7, has a simple and reliable construction. When the passenger carrier 1 is in the stroller mode shown in FIG. 6, the blocking rod 46 is inserted into the drawbar receiving channel 22 and prevents the use of the passenger carrier as a trailer. In this mode, the connecting member 25 is tensioned between the second end 25" at the upper part 41 of the cargo holder 15 and the drawbar holder 10 and keeps the upper part 41 of the cargo holder in a generally upwardly tilted attachment position.

When a drawbar 20 is to be inserted into the drawbar receiving channel 22 as shown in FIG. 7, the blocking rod 46 is pulled out from the drawbar receiving channel 22 resulting in a slackening of the connecting member 25. The slackening of the connecting member 25 in turn triggers blocking of the cargo holder 15 by allowing the upper part 41 of the cargo holder 15 to tilt forward at the hinge means 43, thus altering the configuration of the cargo holder in a manner to make it impossible to attach a baby seat to the cargo holder 15.

The invention claimed is:

1. A multi-function passenger carrier comprising:
a carrier frame; and
a passenger compartment within said carrier frame, said passenger carrier comprising first and second means for attaching a first and a second accessory to said carrier frame,
wherein said carrier frame comprises a security arrangement comprising:
a first blocking arrangement for blocking attachment of said first accessory to said carrier frame,
a second blocking arrangement for blocking attachment of said second accessory to said carrier frame,
first control means for controlling activation and deactivation of said first blocking arrangement,
second control means for controlling activation and deactivation of said second blocking arrangement, and
a connecting member connecting said first control means with said second control means,
said first and second control means being arranged to interact through said connecting member to cause said first blocking arrangement to be activated when said second blocking arrangement is inactivated.

2. A multi-function passenger carrier according to claim 1, wherein said second blocking arrangement is caused to be activated when said first blocking arrangement is inactivated.

3. A multi-function passenger carrier according to claim 1, wherein said first means for attaching an accessory to a part of said passenger carrier frame is a means for attaching an accessory to a lower part of said passenger carrier frame and said second means for attaching an accessory to a passenger carrier frame is a means for attaching an accessory to an upper part of said passenger carrier frame.

4. A multi-function passenger carrier according to claim 1, wherein said first means for attaching an accessory to said carrier frame comprises a holder for a drawbar.

5. A multi-function passenger carrier according to claim 4, said passenger carrier having a front portion and a rear portion in a longitudinal direction, an upper portion and a lower portion in a vertical direction and two side portions in a transverse direction, wherein said holder is arranged at said front portion of said passenger carrier and at said lower portion of said passenger carrier.

6. A multi-function passenger carrier according to claim 4, wherein said holder comprises a channel for inserting an end of said drawbar.

7. A multi-function passenger carrier according to claim 6, wherein said first blocking arrangement comprises a blocking arm which is movable between an active blocking position with a portion of said blocking arm obstructing said channel in said holder and an inactive accessory receiving position wherein said blocking arm is completely withdrawn from said channel in said holder.

8. A multi-function passenger carrier according to claim 1, wherein said second means for attaching an accessory to said carrier frame comprises a cargo holder.

9. A multi-function passenger carrier according to claim 8, wherein said cargo holder is a baby seat holder.

10. A multi-function passenger carrier according to claim 8, said passenger carrier having a front portion and a rear portion in a longitudinal direction, an upper portion and a lower portion in a vertical direction and two side portions in a transverse direction, wherein said cargo holder is arranged at said upper portion of said passenger carrier.

11. A multi-function passenger carrier according to claim 1, wherein a push-handle is connected to said carrier frame.

12. A multi-function passenger carrier according to claim 11, wherein said push-handle is hingedly connected to said carrier frame and is arranged to assume at least two different positions in relation to said carrier frame.

13. A multi-function passenger carrier according to claim 12, wherein said push-handle is comprised in said second blocking arrangement.

14. A multi-function passenger carrier according to claim 13, wherein said push-handle is arranged to block attachment of said second accessory when said push-handle is in a forwardly tilted position on said carrier frame.

15. A multi-function passenger carrier according to claim 14, wherein said second blocking arrangement comprises means for locking said push-handle in said forwardly tilted position.

16. A multi-function passenger carrier according to claim 1, wherein said connecting member comprises a flexible elongated element.

17. A multi-function passenger carrier according to claim 15, wherein said carrier frame comprises at least one hollow frame element and said flexible elongated element is arranged within said at least one hollow frame element.

\* \* \* \* \*